(12) United States Patent
Anderson

(10) Patent No.: US 11,082,314 B2
(45) Date of Patent: Aug. 3, 2021

(54) ELECTRONIC COMPONENTS ENCLOSURE LOCATED IN A STEP STRUCTURE

(71) Applicant: AmpThink, LLC, Garland, TX (US)

(72) Inventor: William C. Anderson, Garland, TX (US)

(73) Assignee: AmpThink, LLC, Garland, TX (US)

( * ) Notice: Subject to any disclaimer, the term of this patent is extended or adjusted under 35 U.S.C. 154(b) by 199 days.

(21) Appl. No.: 16/153,996

(22) Filed: Oct. 8, 2018

(65) Prior Publication Data
US 2020/0112496 A1 Apr. 9, 2020

(51) Int. Cl.
*H02G 3/08* (2006.01)
*H04L 12/26* (2006.01)
*H04L 12/24* (2006.01)

(52) U.S. Cl.
CPC .......... *H04L 43/0811* (2013.01); *H04L 41/06* (2013.01)

(58) Field of Classification Search
CPC .......... H02G 3/08; H02G 3/081; H02G 3/085; H02G 3/10; H02G 3/12; H02G 3/121; H02G 3/086; H02G 3/123; H05K 5/00; H05K 5/02; H05K 5/0204; H05K 5/0217; H04L 43/00; H04L 43/0811; H01R 13/46; H01R 13/52; H01R 13/5213; H01R 13/53; H01R 13/533
USPC ....... 174/50, 53, 57, 58, 480, 481, 535, 559, 174/520, 59, 17 R; 220/3.2–3.9, 4.02; 361/600, 601, 641, 659, 679.01
See application file for complete search history.

(56) References Cited

U.S. PATENT DOCUMENTS

| | | | | |
|---|---|---|---|---|
| 5,721,394 A * | 2/1998 | Mulks | ..................... | H02B 1/305 174/502 |
| 6,444,906 B1 * | 9/2002 | Lewis | ..................... | H02G 3/08 174/53 |
| 6,788,786 B1 * | 9/2004 | Kessler | ................ | H05K 5/0247 379/413.04 |
| 7,205,488 B2 * | 4/2007 | Riner | ..................... | H02G 3/185 174/481 |
| 7,423,215 B2 * | 9/2008 | Cardenas | ............... | H02G 3/121 174/480 |
| 7,439,453 B2 * | 10/2008 | Murano | ............... | G02B 6/4455 174/50 |
| 7,737,360 B2 * | 6/2010 | Wiemeyer | ................ | H04Q 1/13 174/50 |
| 7,795,533 B2 * | 9/2010 | Bravo | ..................... | H02G 3/16 174/50 |
| 8,519,276 B2 * | 8/2013 | Isaacks | .................. | H02G 3/185 174/486 |
| 8,554,042 B2 * | 10/2013 | Ruiz | .................... | G02B 6/4452 385/135 |

(Continued)

*Primary Examiner* — Angel R Estrada
(74) *Attorney, Agent, or Firm* — AmpThink, LLC; James R. Banowsky

(57) ABSTRACT

Systems and methods relate to locating connectivity network components in a step structure. Connectivity network components, such as network switches, network access points, etc., are disposed within structural steps in a spectator venue, such as a sports stadium or arena. Locating network components in stadium steps allows network cabling to be brought closer to network access points, thus bringing about efficiencies in cabling costs and connectivity characteristics. Such systems and methods allow for network access points to be located in greater densities in areas with high user access rates.

20 Claims, 9 Drawing Sheets

(56) References Cited

U.S. PATENT DOCUMENTS

| | | | |
|---|---|---|---|
| 8,901,417 B2 * | 12/2014 | Herring | H05K 5/0008 |
| | | | 174/50 |
| 10,687,436 B2 * | 6/2020 | Franck | H02G 3/081 |

* cited by examiner

ELECTRONIC COMPONENTS ENCLOSURE LOCATED IN A STEP STRUCTURE

BACKGROUND

The personal use of smart communications devices (e.g., phones, tablets, etc.) continues to increase at a dramatic pace, with almost every person in many countries using such a device. Mirroring the growth of such devices, wireless connectivity networks in public spaces are in high demand as people have grown accustomed to being able to access the Internet from their personal electronic devices from nearly everywhere they go, and they expect places they frequent to provide wireless connectivity for the convenience of people using their facilities. Business that do not provide wireless connectivity are at a disadvantage when it comes to attracting customers when customers have choices where wireless connectivity is provided. As such, innovators seek to find new ways to provide wireless connectivity network services in more and different types of places and in ways that increase the quality of wireless network signals and connectivity.

BRIEF DESCRIPTION OF THE DRAWINGS

A particular description of the principles briefly described above will be rendered by reference to specific embodiments thereof, which are illustrated in the appended drawings. Understanding that these drawings depict only certain exemplary embodiments of the disclosure and are not therefore to be considered to limit its scope, the principles herein are described and explained with additional specificity and detail through the use of the accompanying drawings.

DETAILED DESCRIPTION

Figure 1:
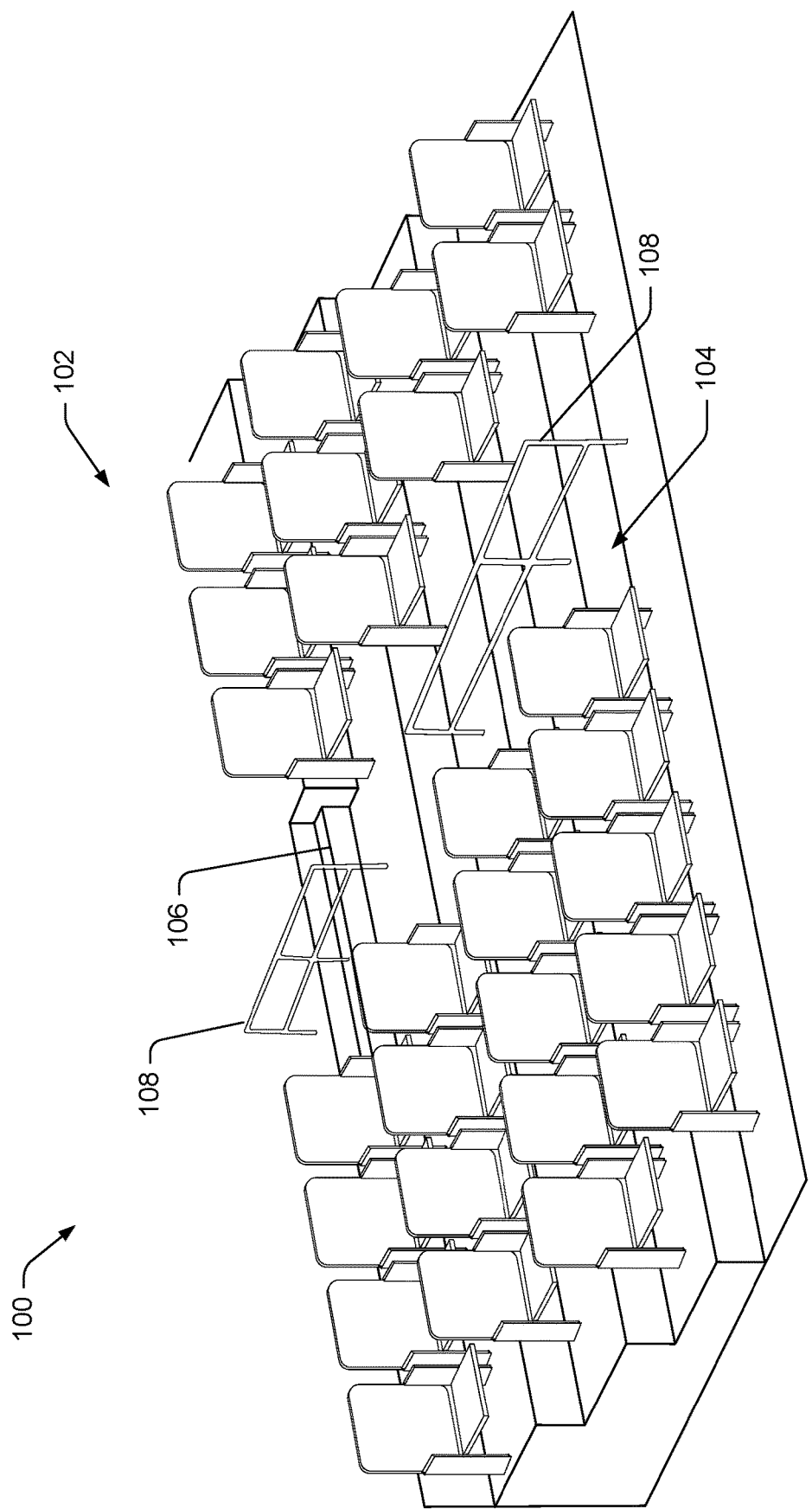
FIG. 1 illustrates a prior art example of a seating section in a spectator venue.

Systems and method are described herein that relate to locating electronic components in a step structure. More particularly, the systems and methods disclosed herein relate to locating wireless networking components in a step structure. The present description provides discussion and examples in a context of a spectator venue, such as a sports arena. However, describing the techniques herein in such a context is not intended to limit application of the techniques in other contexts.

It is noted that in the following description, the term "connectivity network" refers to two or more connected electronic components that cooperate to perform one or more functions. A "connectivity network" may be a wired or a wireless computer network. Generally, as used herein, the term "wireless connectivity network" identifies any means of wirelessly connecting multiple user devices to one or more central servers or peer devices, thus allowing the user devices to access content, services, other user devices, etc. Wireless connectivity networks include, but are not limited to, Wi-Fi networks, Distributed Antenna Systems (DAS), Small Cells, Remote Access Units (RAU), and the like. Wireless connectivity networks are practically a requirement in sporting venues as fans attending sporting events or concerts do not want to be disconnected from the Internet for the several hours' duration of the events. Large-scale public venues present problems for wireless connectivity that are not necessarily present with typical wireless network implementations. Venues such as stadiums and arenas experience a significantly greater amount of cellular usage during events than do other locations. If such venues relied on a local cell tower to provide coverage to so many users, the cell tower and the local network would be quickly overwhelmed. Additionally, arenas and stadiums have very large open areas due to the great dimensions of such structures. Hence, locating wireless network antennas, access points, network switches, and other components at densities enabling high quality network connectivity is difficult, as components cannot be located in the floor/field spaces and the high ceilings—or lack of a ceiling—make it difficult or impossible to hang overhead components so that they are close enough to users to be useful.

Some innovations that have been implemented to solve such problems are techniques to locate wireless network connection points (i.e., points at which user devices connect to a wireless network) under stadium seats, in stadium handrails, in stadium seatbacks, etc. However, there are limitations to such arrangements. Traditional signal distribution for Internet Protocol (IP) networks over copper cabling (i.e., category cabling, e.g., Cat 5, Cat 6, Cat 6A, etc.) is the most efficient way to attach network end points. Using power over Ethernet, a cable can deliver both data and power to equipment. In contrast, fiber optic-based systems cannot natively carry power and the available power solutions for fiber dramatically increase the overall cost of a system.

Wireless alternatives are capacity constrained and there is insufficient spectrum to both distribute and backhaul data. But category cabling has a weakness—cable distances cannot exceed about one hundred (100) meters and still provide acceptable service. In some venues, such a limitation is not difficult to overcome, as equipment cabinets or closets can be distributed throughout the facility so that no endpoint is further than about one hundred (100) meters from an Intermediate Distribution Frame (IDF) or a Main Distribution Frame (MDF) (typically referred to as server/data cabinets or closets). But some venues are more challenging. For example, a football stadium has large open areas that make it difficult to locate network components in optimum places because those places are too far (i.e., more than 100 meters) from anywhere that an IDF can be placed. Furthermore, in older stadiums, the stadium bowl is concrete poured on top of dirt, which makes it very difficult to get network endpoints (e.g., access points) within an appropriate range.

As demand for wireless network services has grown over the past few years, more network access points have been required in more dense installations in areas of increased wireless network usage. For example, typical deployment of access points in stadiums has increased from one access point per approximately two hundred and fifty seats, to one access point per approximately seventy-five seats. Networks deployed at even higher densities will be required to keep up with demand in the near future.

One way that a network can be brought within optimal distances to endpoints in a stadium is to place network connection points (i.e., network switches) in the stadium so that a network endpoint is never more than one hundred (100) meters from a connection point. The systems and method described herein disclose techniques for locating network components (connections points and/or endpoints) in a step structure. By locating connection points in steps, cable length consumed by getting into the stadium bowl, near seats in the bowl, is eliminated as copper cabling. This means that fewer distribution locations (e.g., IDFs) are required, ensuring a more cost effective total solution. However, a stadium step is not an optimum environment for connectivity network components due to a step being exposed to variant temperatures, inclement weather, shock force, spilled beverages, etc. The following disclosure addresses such issues that may arise when installing connectivity network components in a step structure.

The techniques described herein relate to an enclosure for connectivity network components that is installed in a step structure or that itself serves as a step structure. In one implementation, when installed in a step structure, an enclosure is substantially encased by poured concrete (although one or more implementations may have poured concrete on fewer than all sides of an enclosure). In such an implementation, the step is created by the poured concrete. In an alternate implementation, an existing step may be hollowed out to an extent necessary to place an enclosure within the step. After the enclosure is placed with the step, concrete can be poured over and/or around the enclosure to re-create the step. In yet another alternate implementation, the enclosure itself may serve as a step, typically as an intermediate step between original steps. In such an implementation the enclosure has certain properties that protect electronic components located inside the enclosure from adverse externalities, such as moisture, shock, temperature extremes, etc.

The enclosures described herein demonstrate the following characteristics in various combinations among different implementations:
  a. Provides heating in cold environments;
  b. Provides cooling in warm environments;
  c. Seals to protect components from environment (snow, rain, spilled beverages, etc.);
  d. Protects components from shock (foot traffic, kicks, etc.);
  e. Includes integrated ports simplify installation and changes;
  f. Provides pass through for cabling that does not terminate in the enclosure itself;
  g. Includes an extendable component tray that allows for installation of components thereon and simplified access thereto;
  h. A cable management system that prevents cabling from obstruction as the component tray is extended and retracted;
  i. An interface panel that provides simplified connection of structured cabling (cabling or fiber optics) to remote network components;
  j. A fiber splice tray to support connection with fiber optic cabling;
  k. A power supply, uninterruptable or otherwise;
  l. An access door that is integrated into a riser or a tread of a step for simplified access;
  m. Constructed of a material that allows concrete to bind to the material;
  n. Drainage provisions to allow liquid to drain from the enclosure;
  o. etc.

It is noted that the enclosures described herein contain other features not included above. Advantages provided by the features are described in greater detail, below, with respect to the attached drawings.

FIG. 1 illustrates a prior art example seating section 100 in a spectator venue. The example seating section 100 is typical of seating arrangements in spectator venues, and includes a plurality of seats 102 arranged in multiple rows on a tiered structure. Steps 104 are formed by the tiered structure in areas that do not have seats attached thereto. In some scenarios, an intermediate step 106 is placed adjacent to a step to accommodate a comfortable height of a step for a person. Handrails 108 are typically placed along the steps 104 to accommodate venue attendee movement up and down the steps 104.

Figure 2:
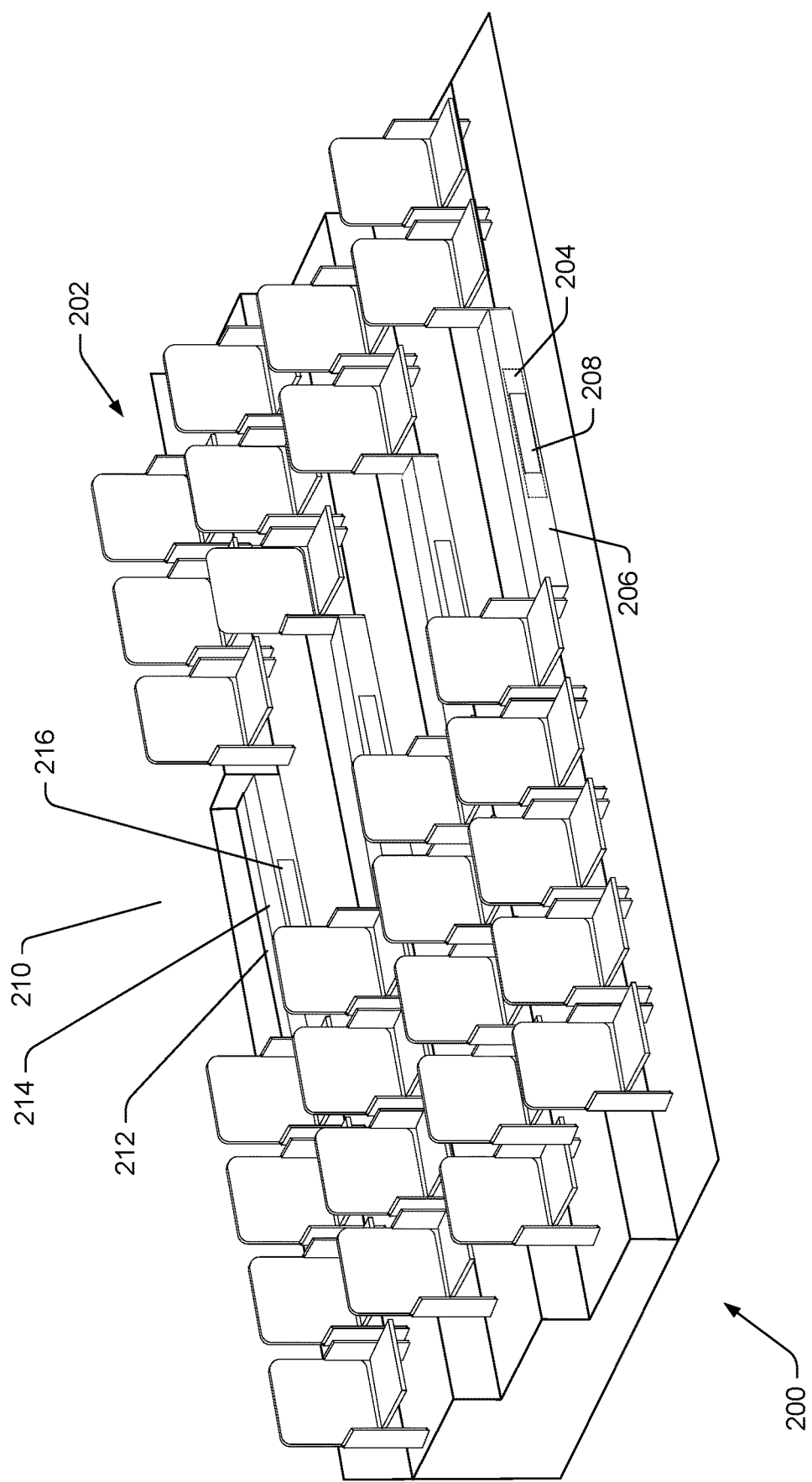
FIG. 2 depicts an example of a seating section in a spectator venue that includes in-step enclosures for connectivity network components.

FIG. 2 depicts an example seating section 200 in a spectator venue that includes a plurality of seats 202. The example seating section 200 also includes an enclosure 204 for housing connectivity network components, the enclosure 204 being integrated into a step 206. The enclosure 204 includes an access door 208 that is exposed from the step 206. The step 206 is an intermediate step 206 that extends across an entire aisle 210 situated between two sections of seats 202. An existing intermediate step 212 is disposed in the aisle 210, and a new intermediate step 214 has been disposed adjacent to the existing intermediate step 212. The existing intermediate step 212 and the new intermediate step 214 together form a single step. An enclosure 216 is disposed inside the new intermediate step 214. It is noted that although the enclosure 216 is shown being disposed inside the new intermediate step 214, in at least one alternate implementation, the new intermediate step 214 is, in itself, the enclosure 216. Furthermore, although steps in which an enclosure is located are shown in FIG. 2 as extending across the entire aisle 210, such steps may have different dimensions than an adjacent step and may not extend across the entire aisle 210.

Figure 3A:
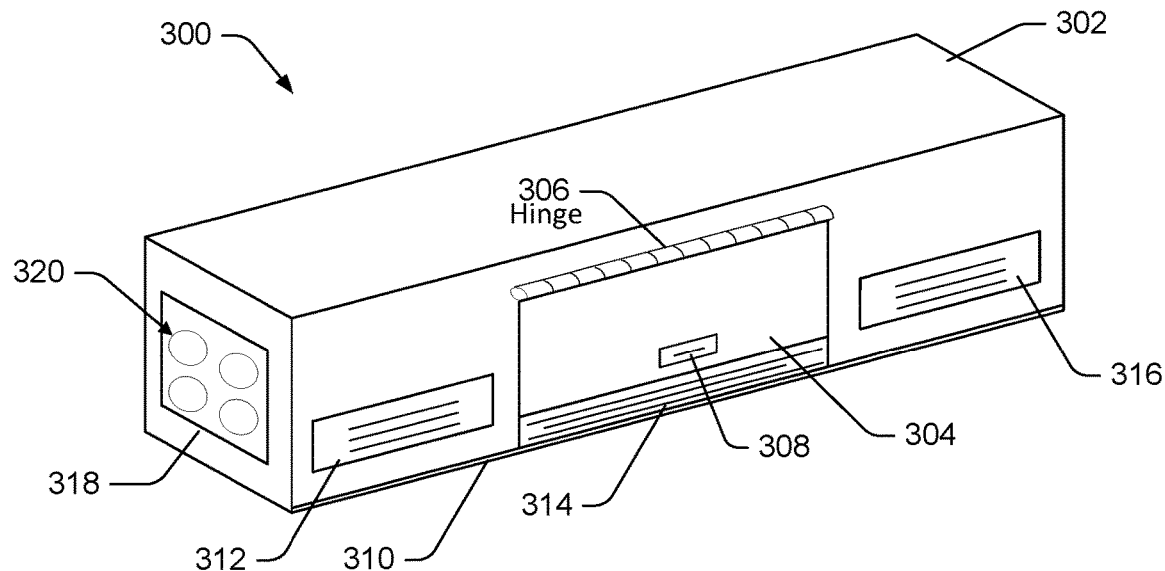
FIG. 3a depicts an example enclosure for connectivity network components in accordance with the description herein, showing an access door in a closed position.

FIG. 3a depicts an example enclosure 300 for connectivity network components in accordance with the description herein. The example enclosure 300 includes a housing 302 and an access door 304 integrated into the housing 302, which is shown in a closed position. The access door 304 is connected to the housing 302 by a hinge 306 or other mechanism that allows the access door 304 to be moved to an open position so that an interior of the housing 302 is accessible. Although not required in some implementations, the example enclosure 300 is shown as having an access mechanism 308 located in the access door 304. The access mechanism 308 may be a key lock, a card reader, a near-field communication (NFC) device, a radio frequency identification (RFID) device, or any other means known in the art for locking an access door.

The example enclosure 300 is shown as having a drain 310 to allow moisture from the example enclosure 300 to drain out of the example enclosure 300 to protect electronic components disposed within the example enclosure 300. In one or more alternate implementations, the enclosure 300 may not include a drain or may include a drain disposed in a different location than the drain 310 shown. The drain 310 may also allow ventilation of the example enclosure 300 to help reduce interior moisture and/to provide a cooling effect for electronic components disposed within the example enclosure. To aid in cooling electronic components disposed within the example enclosure 300, the housing 302 also includes one or more vents 312, 314, 316, disposed at various locations therein to facilitate airflow ventilation.

The example enclosure 300 also includes a cable access plate 318 that includes one or more ports 320 disposed therein. The cable access plate 318 allows cables (coaxial cable, fiber optic cable, etc.) to reach electronic components mounted inside the example disclosure while minimizing exposure of the electronic components to external factors, such as rain, ice, spilled beverages, etc. Further to this end, the ports 320 may be formed as dimpled cutouts in the cable access plate 318 to only the port necessary to a particular implementation are opened.

Figure 3B:
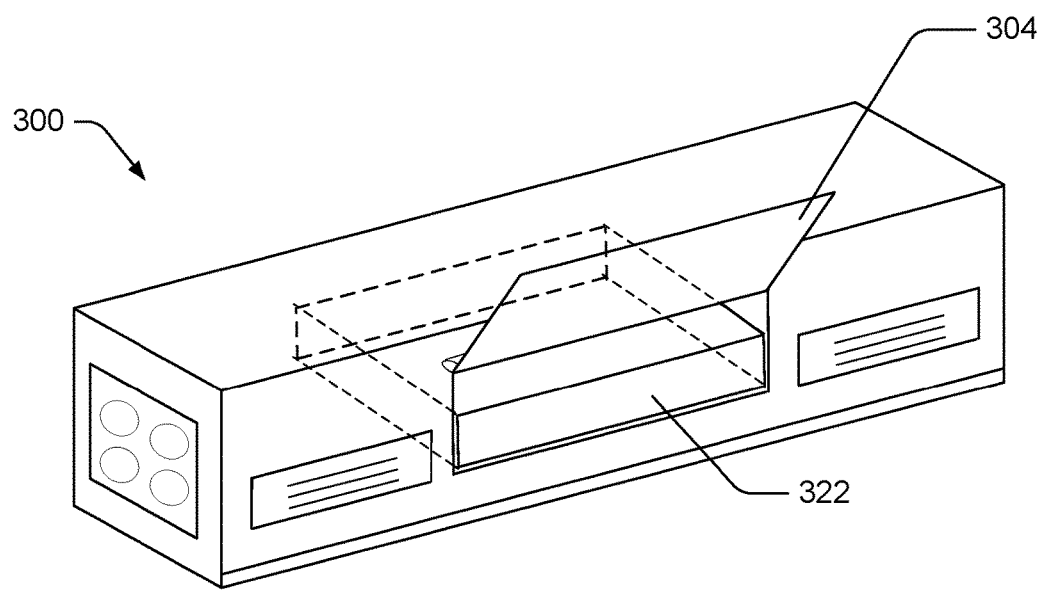
FIG. 3b depicts the example enclosure shown in FIG. 3a, showing the access door in an open position.

FIG. 3b depicts the example enclosure 300 shown in FIG. 3a, showing the access door 304 in an open position. When the access door 304 is in an open position, a component tray 322 disposed inside the housing 302 is accessible from outside the example enclosure 300. As will be described in greater detail below, electronic components may be disposed inside the housing 302 in one of several ways. In the example shown, a component tray 322 is disposed inside the housing 302. Electronic components (not shown) may be connected to the component tray 322, which is extendable outside the housing for convenient access to the electronic components and connecting cables. Although not shown, those skilled in the art will understand that any means for mounting electronic components to the component tray 322 may be used with the described techniques including, but not limited to, a mounting cradle that provides mounts and power connections for electronic components. In addition to providing mounts and power connections, such a mounting system may also provide shock-resistant components to protect electronic devices mounted in the component tray 322. In at least one alternate embodiment, the enclosure 300 does not include the component tray 322 and electronic components (not shown) are mounted directly to the enclosure 300 by other means known in the art.

Figure 4A:
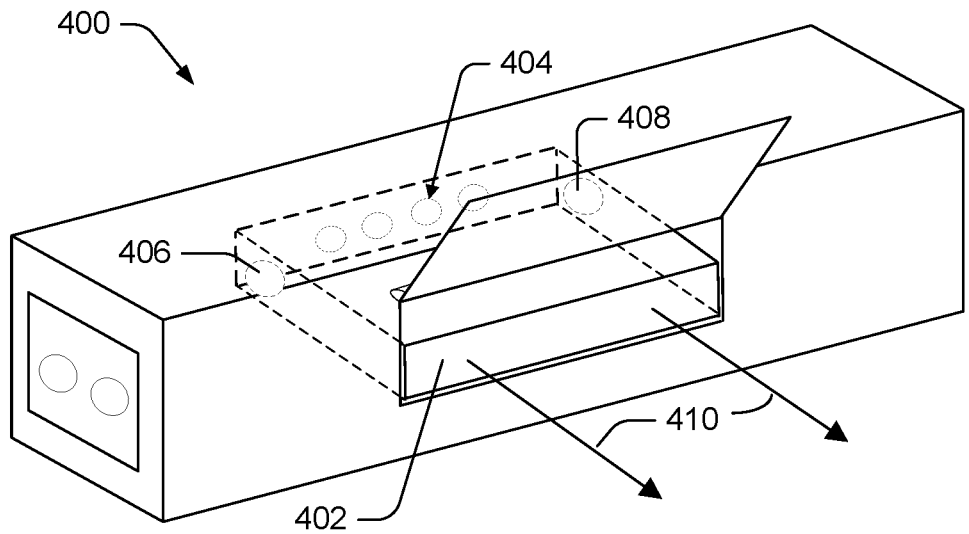
FIG. 4a depicts an example enclosure for connectivity network components in accordance with the description herein, showing a component tray in a retracted position.
Figure 4B:
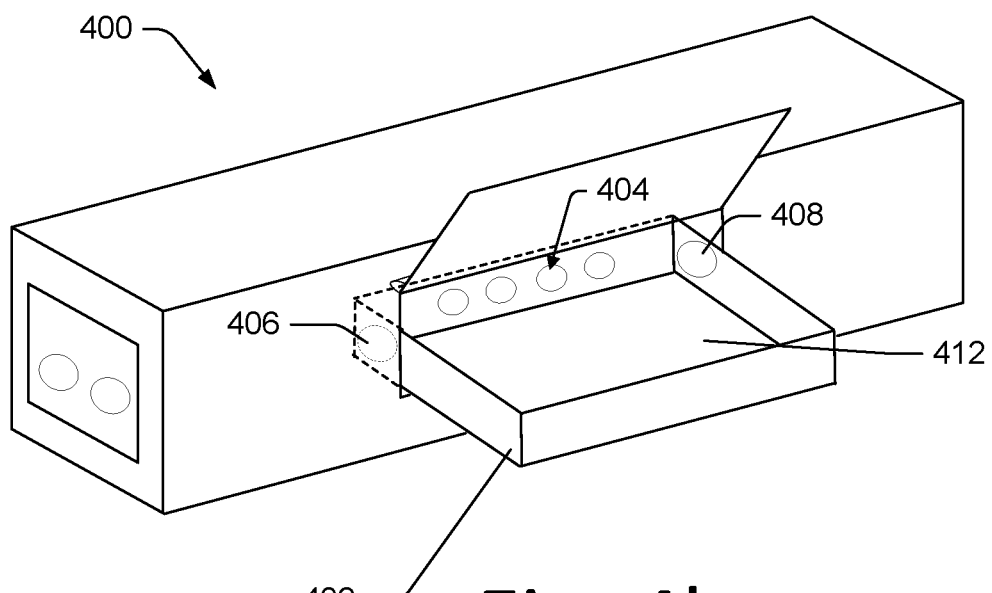
FIG. 4b depicts the example enclosure shown in FIG. 4a, showing the component tray in an extended position.

FIG. 4a and FIG. 4b depict an example enclosure 400 for connectivity network components in accordance with the description herein. In FIG. 4a, a component tray 402 is shown in a retracted position, while in FIG. 4b, the component tray 402 is shown in an extended position. The component tray 402 is suitable for mounting connectivity network components thereupon. The component tray 402 includes one or more rear access ports 404 to allow cabling to pass from a component (not shown) mounted in the component tray 402 to behind the component tray 402. In addition to the rear access ports 404, the component tray 402 also includes a first side access port 404 and a second side access port 404. The first side access port 404 and the second side access port 404 are shown situated substantially along a longitudinal axis of the example enclosure 400. However, other implementations may differ. The side access ports 404, 406 allow cabling to pass from a component (not shown) mounted in the component tray 402 to areas to the sides of the component tray yet still within the example enclosure.

The component tray 402 is movable from the retracted position (as shown in FIG. 4a) to an extended position (as shown in FIG. 4b) along a direction indicated by arrows 410. When the component tray 402 is in the extended position (FIG. 4b), an interior 412 of the component tray 402 is easily accessible, allowing work to be performed, such as mounting or removing electronic components, connecting, disconnecting, or adjusting cabling, etc. Although not shown in FIG. 4, a cable management system may be deployed behind the component tray 402 to prevent cables from tangling with the component tray 402 movement mechanism.

Figure 5:
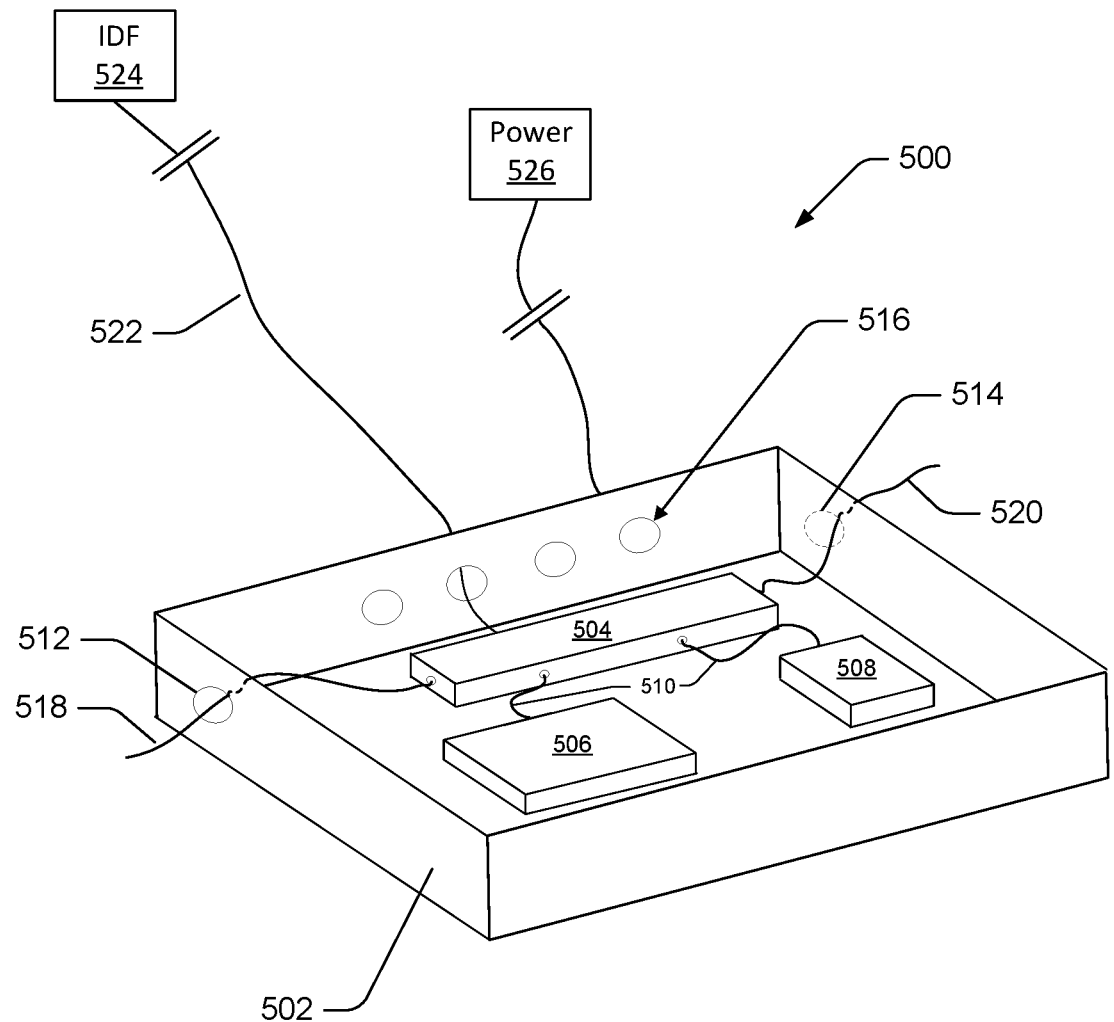
FIG. 5 depicts an example component assembly in accordance with the present description.

FIG. 5 depicts an example component assembly 500 in accordance with the present description. The example component assembly 500 includes a component tray 502 and a patch block 504. The component tray 502 is shown as having a first electronic component 506 and a second electronic component 508 mounted thereto by any technique known in the art. Although two electronic components are shown in FIG. 5, it is noted that any practical number of components—including zero components—may be mounted in the component tray 502. The patch block 504 is communicatively connected to the first electronic component 506 and the second electronic component 508 by cables 510. The present description contemplates the first electronic component 506 and the second electronic component 508 to be components of a network system, such as network switches, access points, antennas, and the like. However, it is noted that one or more components mounted in the component tray 502 may not necessarily be a network component. The step enclosures disclosed herein may be used for a variety of functions, and can include many types of electronic and non-electronic components mounted therein. For example, a charging component (standard AC outlet, low voltage power distribution component, USB port, etc.), an uninterruptable power supply, a cooling fan, a camera, a storage container, or the like may be mounted in the tray. For purposes of discussion, however, the present description will continue in the context of network components.

The patch block 504 serves as a passive connection junction for cabling that originates outside the component tray 502 and terminates inside the component tray 502. The patch block 504 provides for convenient connection between remote components and components mounted in the component tray 502. It is noted that in at least one alternate implementation, the component tray 502 may not have any components other than the patch block 504 mounted therein. In such an implementation, cabling may enter the component tray 502 and connect to the patch block 504, then exit the component tray 502 without connecting to any other component in the component tray 502. In yet another alternate implementation, the component tray 502 is provided without the patch block 504, and cable connections are made directly to components mounted in the component tray 502.

The component tray 502 includes a first side access port 512, a second side access port 514, and at least one rear access port 516. Each of the access ports 512, 514, 516 provides access for cables coming from outside the component tray 502 to inside the component tray 502 and vice-versa. In the present example, cable 518 extends from the patch block 504 through the first side access port 512 and can be connected to a remote device (not shown). Likewise, cable 520 extends from the patch block 504 through the second side access port 514 and can be connected to a remote device (not shown). Cable 522 extends from the patch block 504 through one of the rear access ports 516 and connects the patch block 504 (thus, the components 506, 508 connected to the patch block 504) to a source for telecommunications data, such as an IDF 524. A power source 526 located remote from the component assembly 500 supplies power to the component tray 520 and, thus, to electronic components mounted to the component tray 520. Power may be supplied to components mounted in the component tray 502 through direct wiring or by way of a power block (not shown) configured to distribute power to mounted components.

Figure 6:
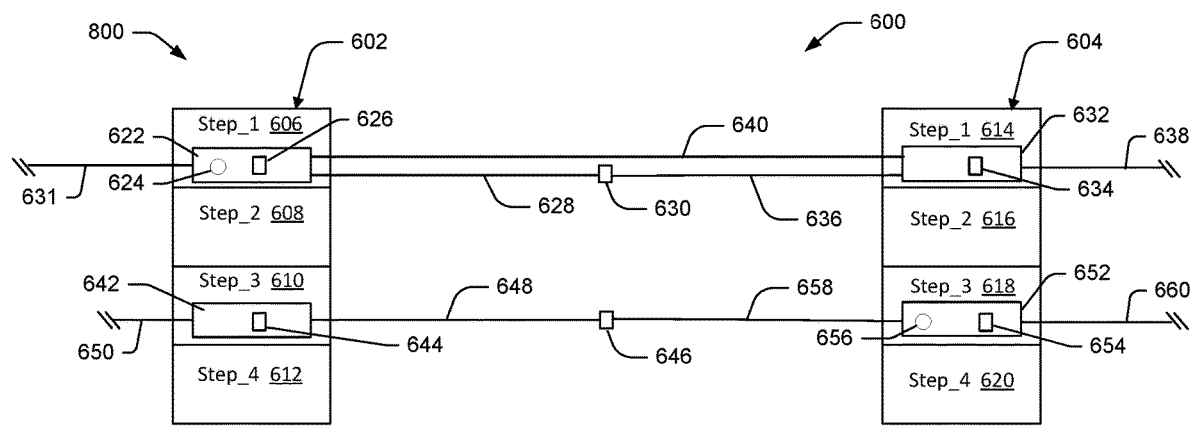
FIG. 6 is a diagram of a portion of an example connectivity network that includes network components situated in enclosures located in step structures.

FIG. 6 is a diagram of a portion of an example connectivity network 600 that includes network components situated in enclosures located in step structures. A first set of steps 602 and a second set of steps 604 are shown in FIG. 6. The first set of steps 602 includes a first Step_1 606, a first Step_2 608, a first Step_3 610, and a first Step_4 612. The second set of steps 604 includes a second Step_1 614, a second Step_2 616, a second Step_3 618, and a second Step_4 620. It is noted that although each set of steps 602, 604 is shown having four (4) steps, a set of steps may have any practical number of steps. Further, the first set of steps 602 and the second set of steps 604 may have a different number of steps.

A first enclosure 622 is shown integrated with first Step_1 606. The first enclosure 622 may be partially enclosed within the first Step_1 606, or the first enclosure 622 may constitute first Step_1 606 (i.e., the enclosure 622 forms the first Step_1 606). The first enclosure 622 houses a first access point 624 and a first network switch 626 (though other, more, or fewer components may be housed by the first enclosure 622). A cable 628 connects one or more components in the first enclosure 622 to an electronic device located between the first set of steps 602 and the second set of steps 604, namely a first seat access point 630. Although the electronic device is shown as an access point, it is noted that the first seat access point 630 may be any other type of electronic device. For example, the electronic device (i.e. first seat access point 630) may be a device cradle that provides a USB connection at a seat location, said USB connection being capable of providing power and/or data connections to a device placed in the device cradle. Alternatively, the electronic components may comprise a network switch or other type of electronic device.

A cable 631 also extends from the first enclosure 622 and may connect with another electronic device (not shown). Cable 628 may consist of multiple cables that connect to more than one device and, therefore, may connect to an electronic device in addition to the first seat access point 630. The first seat access point 630 may be located in any number of places, such as in a seat back, a cup holder, an under-seat enclosure, a handrail enclosure, etc. By virtue of the placement of the first enclosure 622, a length of the cable 628 from the network switch 626 to the first seat access point 630 is minimized, thereby providing an optimum connectivity signal from the first seat access point 630 to seats and users surrounding the first seat access point 630.

A second enclosure 632 is shown integrated with second Step_1 608. The second enclosure 632 may be partially enclosed within the second Step_1 608, or the second enclosure 632 may constitute second Step_1 608 (i.e., the second enclosure 632 forms the second Step_1 608). The second enclosure 632 houses a second network switch 634 (though other, more, or fewer components may be housed by the second enclosure 632). A cable 636 connects the second network switch 634 in the second enclosure 632 to the first seat access point 630, thereby providing a communication capability between the first network switch 626 and the second network switch 634. A cable 638 also extends from the first enclosure 622 and may connect with another electronic device (not shown). Cable 636 may support more than one device and, therefore, may connect to an electronic device in addition to the first seat access point 630. Cable 640 is shown providing a direct connection between the first network switch 626 and the second network switch 634 to indicate that the first network switch 626 and the second network switch 634 may be connected without passing through an intervening network end point.

A third enclosure 642 is shown integrated with first Step_3 610. The third enclosure 642 may be at least partially enclosed within the first Step_3 610, or the third enclosure 642 may constitute first Step_3 610. The third enclosure 642 houses a third network switch 644, which is connected by cable 646 to a second seat access point 648 located in a seating section, in a seatback, a cup holder, an under-seat enclosure, a handrail, or the like. A cable 650 extends from the third network switch 644, out of the third enclosure 642, and to one or more other devices (not shown). It is noted that although the third enclosure 642 is shown housing only one component (i.e. the third network switch 644), other components (not shown) may also be housed in the third enclosure 642.

A fourth enclosure 652 is shown integrated with second Step_3 618, and may be at least partially enclosed therein or may wholly constitute second Step_3 618. The fourth enclosure 652 houses a fourth network switch 654 and a second access point 656. The fourth network switch 654 is connected to the second seat access point 646 by cable 658, and one or more cables 660 extend from the fourth network switch 654 through a port (not shown) in the fourth enclosure 652 to a remote electronic device (not shown).

As the diagram in FIG. 6 shows, in-step enclosures can be utilized in multiple ways to extend network access nearer to end points. As a result, end points can be arranged in greater densities while providing high levels of communication signals. This allows a higher quality of network access to be provided to a greater number of users than the current state of the art. Further details of in-step enclosures are described with reference to subsequent figures, below.

Figure 7:
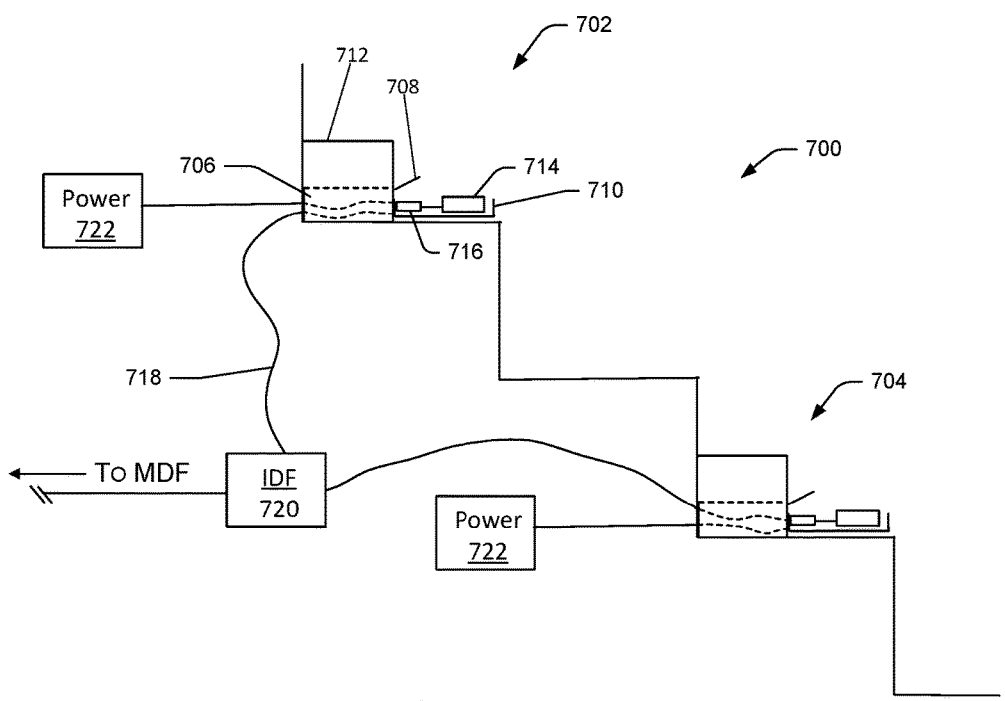
FIG. 7 is a depiction of a side view of a set of steps having example enclosures for connectivity network components located therein in accordance with the present description.

FIG. 7 is a depiction of a side view of a set of steps 700 having example enclosures for connectivity network components located therein in accordance with the present description. The steps 700 include a first enclosure assembly 702 and a second enclosure assembly 704. In this particular example, the first enclosure assembly 702 is identical to the second enclosure assembly 704 and, therefore, further details will only be discussed with reference to elements of the first enclosure assembly 702. Although the first enclosure assembly 702 and the second enclosure assembly 704 are identical in this particular example, it is noted that difference enclosure assemblies may be configured with different components.

The first enclosure assembly 702 includes an enclosure 706 that has an access door 708 and a component tray 710, and an intermediate step 712 in which the enclosure 706 is integrated. The enclosure 706 may be substantially encased in the step 712 or the enclosure 706 may form the step 712. In the example shown, the enclosure 706 is partially encased in the step 712 such that the access door 708 is exposed in a riser of the step 712. Concrete poured around the enclosure 706 partially encases the enclosure 706 and forms a tread of the step 712. Although not shown in FIG. 7, access ports are formed in the ends of the enclosure 706 similar to what is shown in other figures, to allow cabling to pass into and out of the enclosure 706. For this purpose, conduit may be located in the concrete making up the step 712 in embodiments where the enclosure 706 does not extend from one end of the step 712 to the other. Such configurations are shown and described in greater detail with respect to subsequent figures. In at least one alternate embodiment, the access door 708 is located in a top side of the enclosure 706. In such an embodiment, the access door 708 forms at least a portion of the tread of the step 712 and access to components mounted inside the enclosure 706 is made from the top of the step 712.

A network switch 714 and a patch block 716 are shown mounted to the component tray 710, although it is noted that additional or different components may be mounted to the component tray 710. A cable 718 connects the patch block 716 to a data source, such as an IDF 720. The patch block 716 is thus able to pass data to and from the network switch 714. The component tray 710 receives power from a power source 722 and components (i.e., network switch 714) mounted to the component tray 710 receive power therefrom. Multiple power sources and multiple IDFs may be utilized in a spectator venue to provide power and data to multiple enclosures and housed connectivity components.

Figure 8:
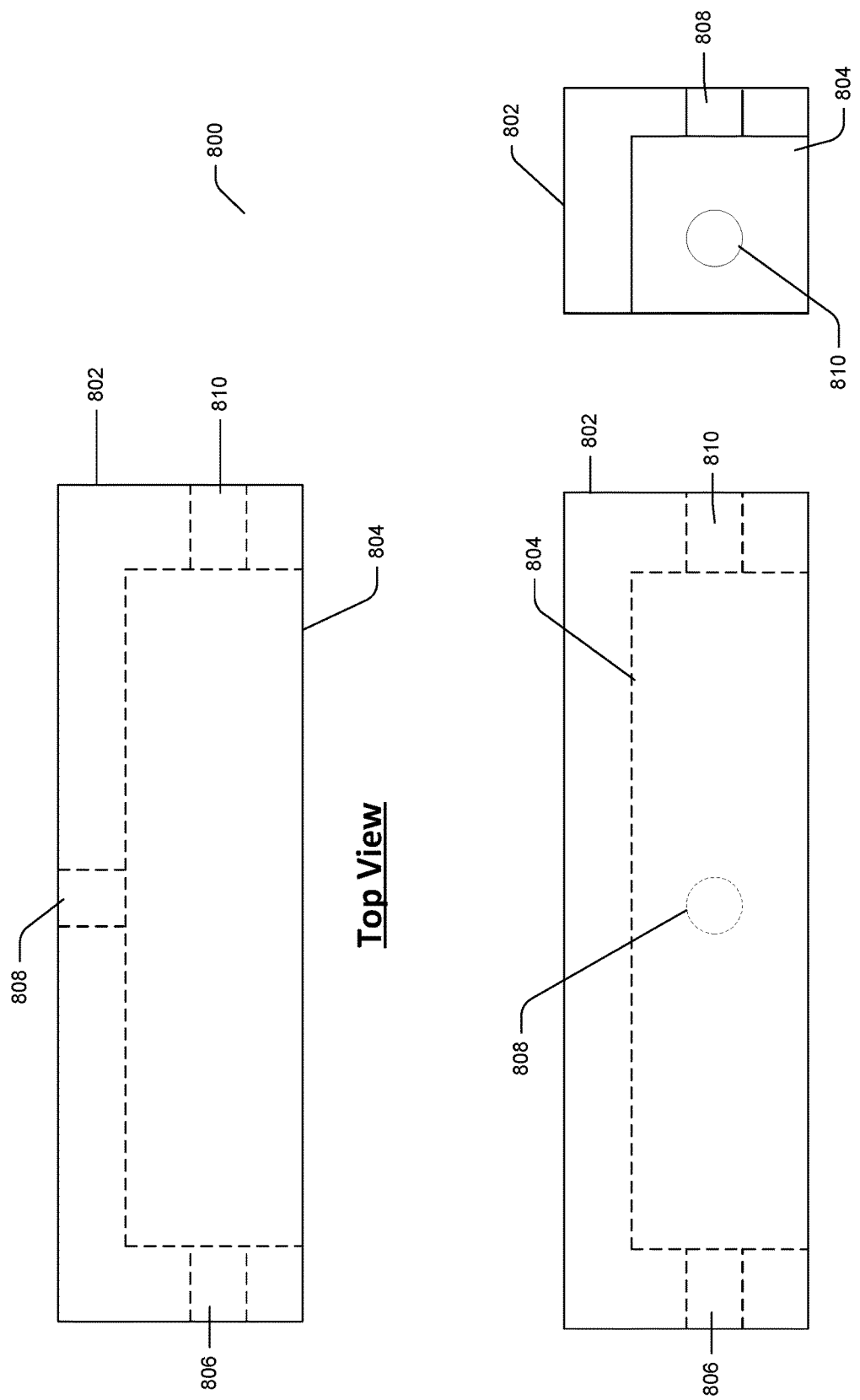
FIG. 8 depicts multiple views of a step structure constructed to house connectivity components as described herein.

FIG. 8 depicts multiple views (front elevation, top elevation, and side elevation) of a step structure 800 constructed to house connectivity components as described herein. The step structure 800 includes a step 802 and an enclosure 804 at least partially enclosed by the step 802. The step structure 800 also includes multiple conduits that provide a pathway for cabling to enter into the enclosure 804 from outside the enclosure 804 and the step 802. Conduits include a first side conduit 806, a rear conduit 808, and a second side conduit 810. The conduits 806, 808, 810 substantially line up with side and rear access ports of the enclosure 804 as shown in previous figures. It is noted that the drawings of FIG. 8 are not necessarily to scale, and that a length and a diameter of the conduits 806, 808, 810 may be relatively smaller or larger than shown. The enclosure 804 includes an access door 812 that is exposed on one side of the step 802. The step 802 that surrounds the enclosure 804 may be constructed of any material suitable for the purpose. In at least one embodiment, the step structure 800 includes a step 802 made of concrete situated around the enclosure 804. The concrete may be poured with the enclosure 804 in place, or the enclosure 804 may be placed in a hollowed section made in an existing concrete step. In at least one other embodiment, the step structure 800 is constructed of wood that is built to form a step around the enclosure 804. Any material used for such purpose must be able to withstand stresses typically placed on steps that are traversed by human traffic.

Figure 9:
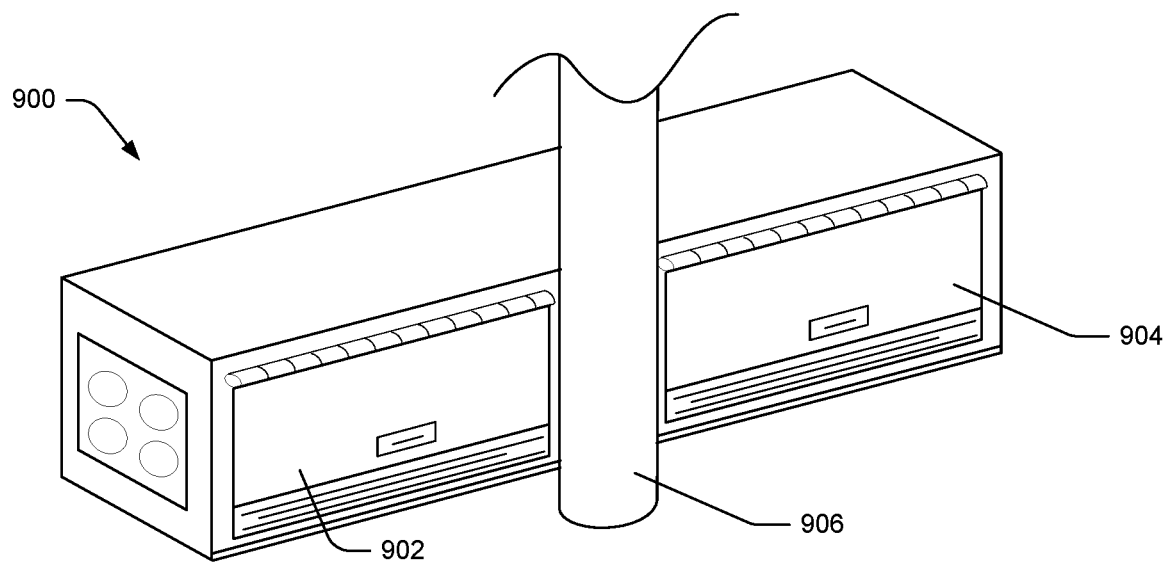
FIG. 9 depicts an example enclosure for connectivity network components in accordance with the description herein.

FIG. 9 depicts an example enclosure 900 for connectivity network components in accordance with the description herein. It is noted that although the example enclosure 900 is shown standing alone in an exposed state, the example enclosure 900 is typically at least partially encased in a material (such as concrete) that forms the step that is traversed by spectator venue attendees. Such an encasing material is not shown in the present example so as to more clearly point out the features of the example enclosure 900.

In some instances, an obstruction may be positioned such that it would impede opening of an enclosure access door if an enclosure was put into place adjacent to the obstruction. The example enclosure 900 shown in FIG. 9 is adapted for such contexts. The example enclosure 900 includes dual access doors, to-wit: a first access door 902 and a second access door 904. The first access door 902 and the second access door 904 are similar to the access door 304 shown in and described with respect to FIG. 3a and may contain features associated with the access door 304 or additional features not explicitly shown herein. The access doors 902, 904 allow convenient access to the example enclosure 900 in a context wherein an obstruction blocks access via a single access door such as access door 304 (FIG. 3a). An obstruction depicted in FIG. 9 is a portion of a handrail 906. Handrails situated in spectator venues often are secured in place by setting a portion of the handrails in cement that constitutes a step structure. In such contexts, an enclosure having a single access door may not operate to allow access to the enclosure because the single access door may be blocked by a portion of a handrail. The dual access doors 902, 904 of the example enclosure 900 allow access to the example enclosure 900 around an adjacent portion of a handrail 906. By having dual access doors, access to the enclosure around the handrail 906 can be made. Connectivity network components, as shown in and described with respect to previous figures, can be mounted inside the example enclosure 900. In some embodiments, such components may be mounted to component trays as previously described. In an embodiment having dual access doors, an enclosure may include dual component trays (not shown) to allow ease of access to network components.

Figure 10:
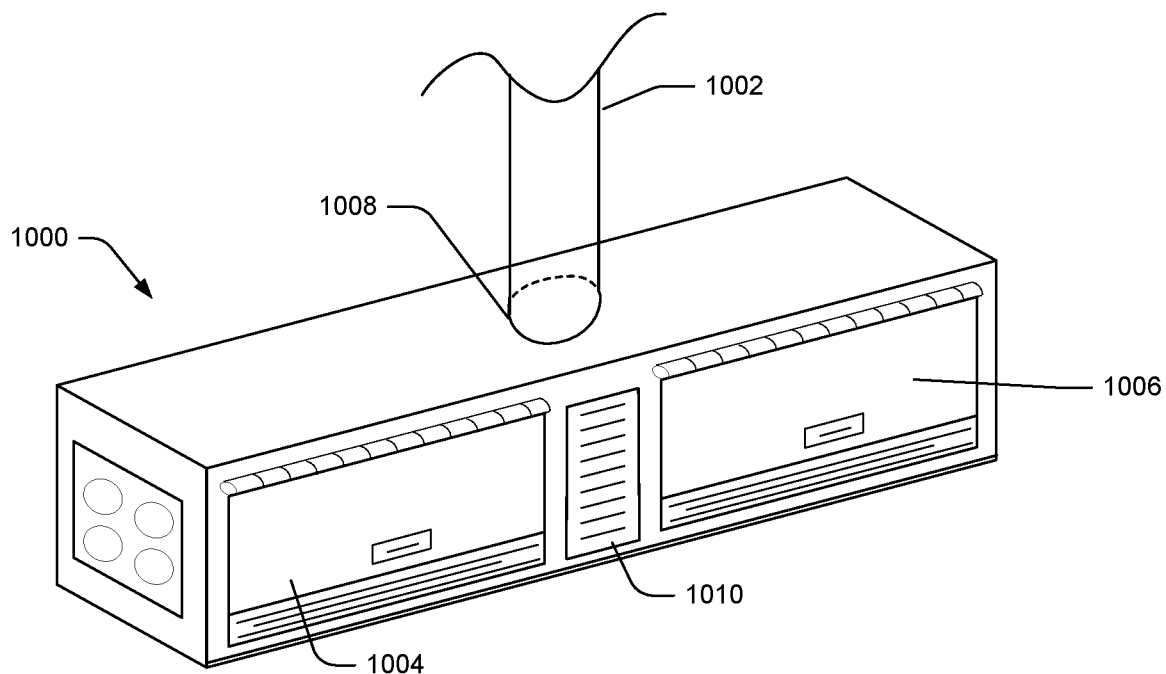
FIG. 10 depicts an example enclosure for connectivity network components in accordance with the description herein.

FIG. 10 depicts an example enclosure 1000 for connectivity network components in accordance with the description herein. It is noted that although the example enclosure 1000 is shown standing alone in an exposed state, the example enclosure 1000 is typically at least partially encased in a material (such as concrete) that forms the step that is traversed by spectator venue attendees. Such an encasing material is not shown in the present example so as to more clearly point out the features of the example enclosure 1000.

Similar to the situation wherein an obstruction adjacent to an enclosure hinders access to the enclosure, in some contexts, a handrail 1002 may be situated in a location where an in-step enclosure needs to be placed. In such a situation, a dual access door enclosure such as shown in FIG. 9 may not obviate the problem. The example enclosure 1000 shown in FIG. 10, however, provides a way to accommodate such a handrail 1002. The example enclosure 1000 includes a first access door 1004 and a second access door 1006. Provision of dual access doors allows for component location and access to such components in such a way so that the handrail 1002 does not interfere therewith. The example enclosure 1000 also includes a handrail receptacle 1008 configured to receive a portion of the handrail 1002. The handrail receptacle 1008 may extend completely through the example enclosure 1000 (from top to bottom) to allow the handrail 1002 to be fixed in a structure on which the example enclosure 1000 is disposed, or the handrail receptacle 1008 may extend partially through the example enclosure 1000 and terminate on a structure (such as a concrete pad, a bracket, etc.) (not shown) located within the example enclosure 1000.

The space between the dual access doors 1004, 1006 may be utilized to include an additional feature in an enclosure. The example enclosure 1000 includes a vent 1010 located between the first access door 1004 and the second access door 1006, which can be used to aid in temperature regulation inside the example enclosure 1000. In at least one alternate implementation, such a vent may not be present.

Furthermore, although not shown in FIG. 10, dual component trays may be disposed within the example enclosure, one component tray corresponding with each access door.

Figure 11:
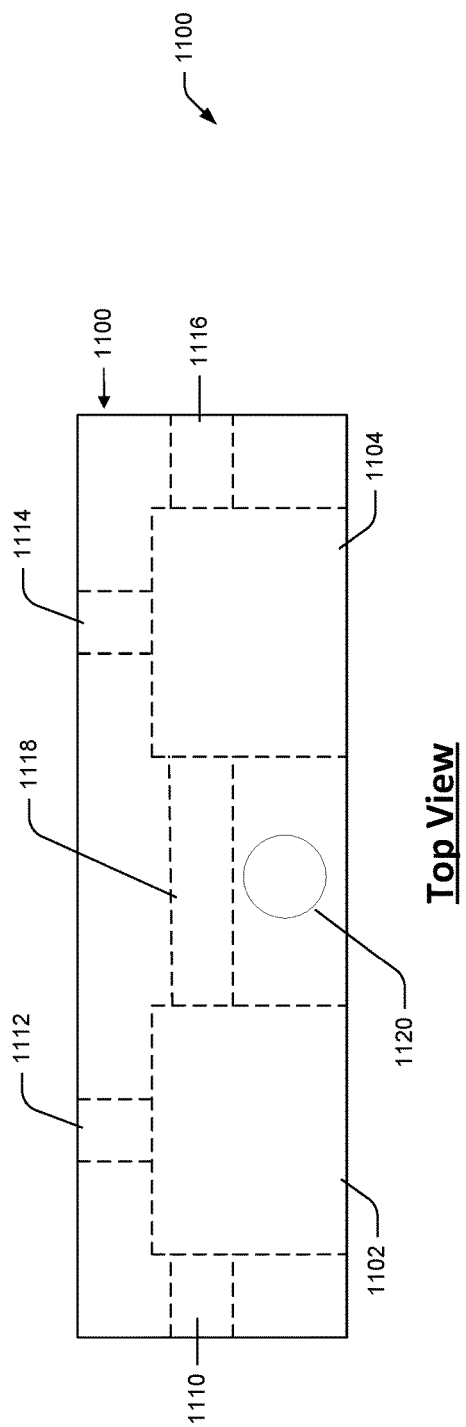
FIG. 11 is a diagram of an example enclosure for housing connectivity network components.
Figure 11:
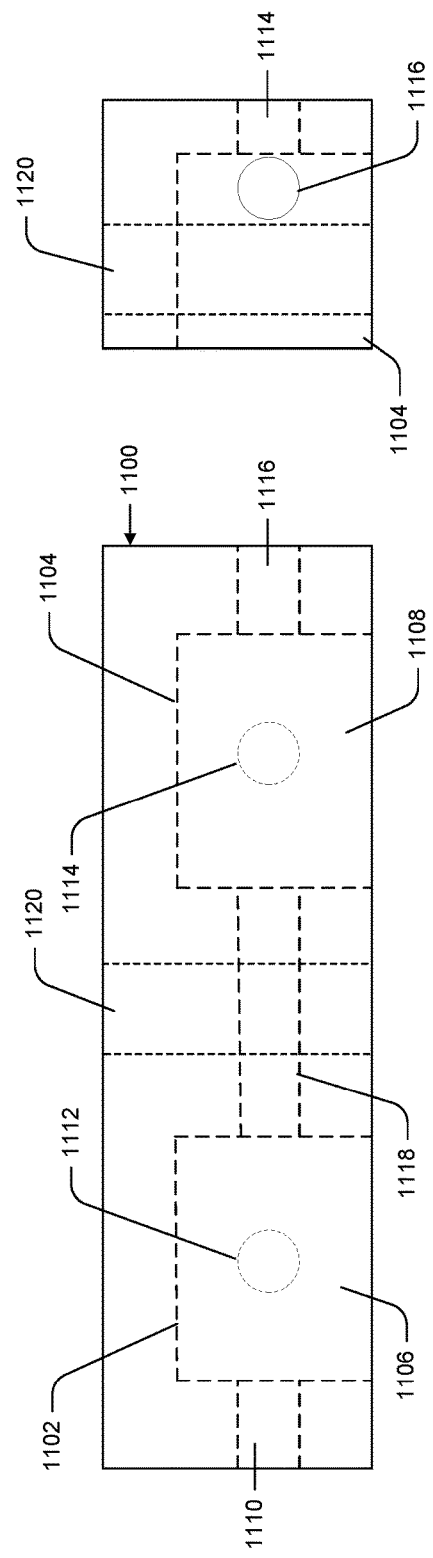

FIG. 11 is a diagram of an example enclosure 1100 for housing connectivity network components. The example enclosure 1100 is shown in three elevation views (front view, top view, side view). The example enclosure 1100 is similar to the example enclosure 1000 shown in and described with respect to FIG. 10; particularly, the example enclosure 1100 is constructed to accommodate a handrail and the example enclosure has dual access doors.

The example enclosure 1100 includes a first compartment 1102 and a second compartment 1104 that are configured to house connectivity network components (not shown). A first access door 1106 provides access to the first compartment 1102 and a second access door 1108 provides access to the second compartment 1104. Although not shown in FIG. 11, each compartment 1102, 1004 may include a component tray to which connectivity network components may be mounted. The example enclosure also includes a first side conduit 1110, a first rear conduit 1112, a second rear conduit 1114, a second side conduit 1116, and an internal conduit 1118. The side and rear conduits 1110-1116 allow cabling to pass from each compartment 1102, 1004 to outside the example enclosure 1100. The internal conduit 1118 allows cabling to pass from the first compartment 1102 to the second compartment 1104 and vice-versa.

The example enclosure 1100 also includes a handrail receptacle 1120 configured to receive a portion of a handrail or other support structure (not shown). The handrail receptacle 1120 extends through the example enclosure 1100, from a top of the example enclosure 1100 to the bottom of the example enclosure 1100, which allows a handrail (not shown) to be fixed in a structure on which the example enclosure is disposed. In at least one alternate implementation, the handrail receptacle 1120 extends only part-way through the example enclosure 1100. In such an implementation, a handrail would terminate and be fixed to a structure (not shown) located within the example enclosure 1100, such as a concrete pad, a metal bracket, or some other similar support structure.

It is also noted that although an apparatus for housing connectivity network devices is shown in FIG. 11 as an enclosure, at least one alternate embodiment may be constructed without the use of an enclosure. In such an embodiment, the elements of the example enclosure 1100 may be fixed in a construction medium such as concrete. Further, the first compartment 1102 and the second compartment 1104 would constitute enclosures in such an embodiment to protect internal components from surrounding the construction medium.

CONCLUSION

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. An enclosure for connectivity network components disposed within a structural step, comprising:
   a housing configured to receive at least one connectivity network component;
   an access door formed in the housing; and
   wherein the enclosure is disposed within the structural step and the access door is configured to provide access to an interior of the enclosure and the structural step.

2. The enclosure as recited in claim 1, further comprising at least one cable access port that provides cable access from outside the enclosure to the at least one connectivity network component.

3. The enclosure as recited in claim 1, further comprising a component tray disposed within the housing an configured to mount the at least one connectivity network component, wherein the component tray is configured to move from a retracted position within the enclosure to an extended position at least partially outside the enclosure.

4. The enclosure as recited in claim 3, wherein the component tray further comprises at least one cable access port that allows a cable originating outside the component tray to connect to the at least one connectivity network component located inside the component tray.

5. The enclosure as recited in claim 1, further comprising temperature regulation means disposed within the housing and configured to regulate a temperature inside the housing.

6. The enclosure as recited in claim 1, further comprising a patch block.

7. The enclosure as recited in claim 1, further comprising a second access door configured to provide access to the interior of the housing.

8. The enclosure as recited in claim 1, wherein the at least one connectivity component further comprises a network switch.

9. The enclosure as recited in claim 1, wherein the at least one connectivity component further comprises a network access point.

10. The enclosure as recited in claim 1, wherein the access door is the only portion of the enclosure that is exposed from the structural step.

11. A method, comprising:
    providing an enclosure into which at least one connectivity network component may be mounted, the enclosure including an access door formed therein that allows access to an interior of the enclosure; and
    mounting the enclosure inside a structural step so that the structural step substantially surrounds the enclosure leaving the access door of the enclosure exposed so the interior of the enclosure can be accessed when the enclosure is mounted inside the structural step; and
    wherein an access door of the enclosure is exposed from the structural step, the access door providing access to an interior space of the enclosure.

12. The method as recited in claim 11, further comprising mounting at least one connectivity network component in the enclosure.

13. The method as recited in claim 11, wherein the enclosure further includes a component tray that extends from a retracted position within the enclosure, through the access door to a position at least partially outside the enclosure.

14. The method as recited in claim 11, further comprising providing conduit within the structural step, said conduit providing cable access from an exterior surface of the step structure to a surface of the enclosure.

15. The method as recited in claim 11, wherein the enclosure further comprises at least one cable access port through which cabling can pass from the interior of the enclosure to outside the step structure.

16. The method as recited in claim 11, wherein the enclosure further comprises temperature regulation means to provide cooling to the one or more connectivity network components mounted in the enclosure.

17. The method as recited in claim 16, wherein the temperature regulation means further comprises at least one air vent.

18. The method as recited in claim 16, wherein the temperature regulation means further comprises an electric fan.

19. The method as recited in claim 11, wherein the mounting the enclosure inside a structural step further comprises at least partially encasing the enclosure in concrete such that the concrete forms the structural step.

20. The method as recited in claim 11, wherein the mounting the enclosure inside a structural step that at least partially surrounds the enclosure further comprises:
  creating an opening in a structural step;
  disposing the enclosure in the structural step; and
  re-creating the integrity of the structural step.

* * * * *